(12) United States Patent
Kim

(10) Patent No.: US 9,424,746 B2
(45) Date of Patent: Aug. 23, 2016

(54) SYSTEM AND METHOD FOR SETTING WARNING REFERENCE OF ADVANCED DRIVER ASSISTANCE SYSTEM

(71) Applicant: Hyundai Motor Company, Seoul (KR)

(72) Inventor: Seon Su Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 353 days.

(21) Appl. No.: 14/138,650

(22) Filed: Dec. 23, 2013

(65) Prior Publication Data
US 2015/0015416 A1 Jan. 15, 2015

(30) Foreign Application Priority Data

Jul. 11, 2013 (KR) .................. 10-2013-0081601

(51) Int. Cl.
*G06F 7/00* (2006.01)
*G08G 1/01* (2006.01)
*G08G 1/16* (2006.01)
*H04L 29/08* (2006.01)
*G01C 21/36* (2006.01)
*B60W 50/00* (2006.01)
*B60W 50/14* (2012.01)

(52) U.S. Cl.
CPC ............ *G08G 1/0129* (2013.01); *G08G 1/0112* (2013.01); *G08G 1/164* (2013.01); *H04L 67/125* (2013.01); *B60W 2050/0077* (2013.01); *B60W 2050/143* (2013.01); *G01C 21/3697* (2013.01)

(58) Field of Classification Search
None
See application file for complete search history.

(56) References Cited

U.S. PATENT DOCUMENTS

2005/0137753 A1* 6/2005 Basson ................. G01C 21/26 701/1
2012/0215432 A1* 8/2012 Uyeki .............. G08G 1/096827 701/118

FOREIGN PATENT DOCUMENTS

| KR | 10-2003-0031230 | | 4/2003 |
|---|---|---|---|
| KR | 10-2009-0054171 | A | 5/2009 |
| KR | 10-2009-0124333 | | 12/2009 |
| KR | 10-2010-0034364 | | 4/2010 |
| KR | 10-2012-0066468 | A | 6/2012 |

* cited by examiner

*Primary Examiner* — Adam Alharbi
(74) *Attorney, Agent, or Firm* — Mintz Levin Cohn Ferris Glovsky and Popeo, P.C.; Peter F. Corless

(57) ABSTRACT

A system and method for setting a warning reference of an advanced driver assistance system are provided. The method includes receiving, by a controller, vehicle information based on a driving condition from a telematics terminal and calculating statistical data for each item of the vehicle information based on the collected vehicle information. In addition, the controller is configured to store the statistical data in a database and calculate at least one time series risk index based on statistical data and a computation weight table stored in the database. The time series risk index is then transmitted to the telematics terminal.

19 Claims, 11 Drawing Sheets

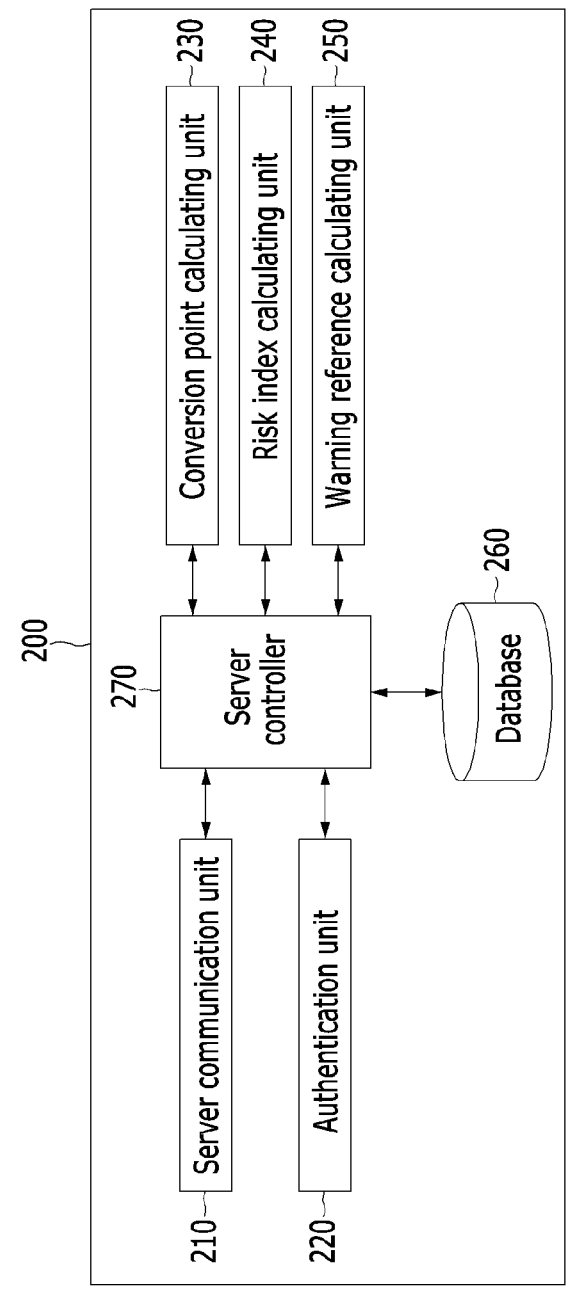

FIG. 4
<Time series conversion point>

| Item | | source | Statistical data | Time series conversion point (Specific time while driving is exemplified) |
|---|---|---|---|---|
| Route | Expected driving distance | Telematics terminal or navigation terminal (Mean driving distance when destination is not input) | 100km | 70 |
| | Expected driving hour | Telematics terminal or navigation terminal (Mean driving distance when destination is not input) | 1.5 hours | 60 |
| | Accident occurrence section | Traffic information server | 5 Spots | 90 |
| | Number of times to visit driving section | Telematics server | 3 times / year | 90 |
| | ... | ... | ... | ... |
| Weather | Temperature | Weather information server | Time serial graph | 80 |
| | Humidity | Weather information server | Time serial graph | 70 |
| | Fog | Weather information server | Time serial graph | 75 |
| | Rain | Weather information server | Time serial graph | 65 |
| | Snow | Weather information server | Time serial graph | 90 |
| | ... | ... | ... | ... |
| Driving information | Mean driving hour | Telematics server | 0.6 hours | 30 |
| | Mean speed | Telematics server | 60km/h | 56 |
| | Acceleration/ deceleration index | Telematics server | 40 | 38 |
| | Driving frequency for each date | Telematics server | Graph | 22 |
| | Main driving hour zone | Telematics server | Graph | 20 |
| | Main driving section | Telematics server | Graph | 48 |
| | Multimedia operating history | Telematics server | 3 times / year | 68 |
| | Safety device operating history | Telematics server | 2 times / year | 44 |
| | ADAS operating history | Telematics server | 7 times / year | 80 |
| | ... | ... | ... | ... |
| Vehicle information | ADAS function or not | Telematics server | O/X | 89 |

FIG. 5
<Computation weight table>

| | Item | First weight (Driver fatigue index) | Second weight (Drowsiness driving index) | Third weight (Driver view index) | Fourth weight (Section intimacy index) | Fifth weight (Section risk index) |
|---|---|---|---|---|---|---|
| Route | Expected driving distance | 17% | 15% | 2% | 1% | 1% |
| | Expected driving hour | 19% | 15% | 2% | | 1% |
| | Accident occurrence section | 5% | 10% | 2% | 5% | 70% |
| | Number of times to visit driving section | 1% | 10% | 2% | 70% | |
| | ... | | | | | |
| Weather | Temperature | | 5% | 1% | | |
| | Humidity | | 5% | 5% | | |
| | Fog | 13% | 5% | 15% | 1% | 1% |
| | Rain | 13% | 5% | 15% | 1% | 1% |
| | Snow | 13% | 5% | 20% | 1% | 1% |
| | ... | | | | | |
| Driving information | Mean driving hour | 2% | 5% | 5% | | |
| | Mean speed | 2% | 5% | 3% | | 1% |
| | Acceleration/deceleration index | 2% | 5% | 3% | | 5% |
| | Driving frequency for each date | | | 2% | 1% | 2% |
| | Main driving hour zone | 2% | | 5% | | 1% |
| | Main driving section | | | 3% | 10% | 1% |
| | Multimedia operating history | 2% | | | | |
| | Safety device operating history | 4% | 5% | 5% | 5% | 5% |
| | ADAS operating history | 2% | | 5% | | 5% |
| | ... | | | | | |
| Vehicle information | ADAS function or not | 3% | 5% | 5% | 5% | 5% |

→ Time series risk index =
Time series conversion point X Computation weight + First correction value

FIG. 7

| Classification | Conversion point | Sixth weight |
|---|---|---|
| Swing movement | 70 | 30% |
| Operation of ADAS or not | 65 | 15% |
| In-vehicle temperature/humidity | 80 | 20% |
| Body temperature | 25 | 10% |
| Pulse | 35 | 10% |
| Driving hour zone | 10 | 5% |
| Section coincidence | 46 | 5% |
| Tire pressure | 70 | 5% | ex) Corrected drowsiness driving index =
    Drowsiness driving index X 20% + Second correction value X 80%

FIG. 9

| Classification | Seventh weight (Warning reference of vehicle lane keeping) | Eighth weight (Warning reference of front collision avoidance) |
|---|---|---|
| Driver fatigue index | 30% | 20% |
| Drowsiness driving index | 35% | 40% |
| Driver view index | 20% | 25% |
| Section intimacy index | 5% | 10% |
| Section risk index | 10% | 5% |

→ Time series warning reference =
  Time series risk index X Computation weight + Third correction value

SYSTEM AND METHOD FOR SETTING WARNING REFERENCE OF ADVANCED DRIVER ASSISTANCE SYSTEM

CROSS-REFERENCE TO RELATED APPLICATION

This application claims priority to and the benefit of Korean Patent Application No. 10-2013-0081601 filed in the Korean Intellectual Property Office on Jul. 11, 2013, the entire contents of which are incorporated herein by reference.

BACKGROUNDNTION (a) Field of the Invention

The present invention relates to a system and method for setting a warning reference of an advanced driver assistance system, and more particularly, to a system and method for setting a warning reference of an advanced driver assistance system that assists safe driving by setting a warning reference which is changed with time based on vehicle information depending on a driving condition.

(b) Description of the Related Art

Telematics as a term in which telecommunication and information science are joined is defined as vehicle information that provides service through a combination of an IT industry in which wireless communication, a vehicle, a terminal, contents, and the like are mutually organically associated with each other, and a motor industry. Telematics technology may provide various multimedia services such as traffic information, emergency rescue information, a vehicle diagnosis service, and the Internet to a user using wireless communication technology and global positioning system (GPS) technology.

In recent years, an advanced driver assistance system (ADAS) that recognizes an accident risk in advance to prevent an accident or assist driving has been actively mounted within a vehicle. The advanced driver assistance system (ADAS) includes a lane keeping assist system (LKAS), a collision avoidance system (CAS), a driver drowsiness detection system, an adaptive cruise control (ACC) system, a blind spot detection (BSD) system, a parking assistance system (PAS), and the like.

In the related art, the advanced driver assistance system maintains a partciular, performs collision avoidance, and the like based on a set warning reference. In recent years, the warning reference tends to be changed based on ADAS map information. Further, the driver drowsiness detection system in the related art determines drowsiness by recognizing movement of a pupil and a face of a driver using an internal camera. However, in the ADAS of the related art a driver's driving pattern is not reflected and the warning reference is uniformly applied.

The above information disclosed in this section is only for enhancement of understanding of the background of the invention and therefore it may contain information that does not form the prior art that is already known in this country to a person of ordinary skill in the art.

SUMMARY

The present invention provides a method for setting a warning reference of an advanced driver assistance system that may be optimized for each driver by setting a warning reference that may change with time based on telematics technology and vehicle information depending on a driving condition.

An exemplary embodiment of the present invention provides a method for setting a warning reference of an advanced driver assistance system that may include: receiving, by a controller, vehicle information based on a driving condition from a telematics terminal; calculating, by the controller, statistical data for each item based on the collected vehicle information; storing, by the controller, the statistical data in a database; calculating, by the controller, at least one time series risk index based on statistical data and a computation weight table stored in the database; and transmitting the time series risk index to the telematics terminal.

The vehicle information may include at least one selected from a group consisting of a destination, driver's personal information, driving distance information, driving hour information, vehicle speed information, acceleration/deceleration information, driving section information, a multimedia operating history, a safety device operating history, and a driver assistance system operating history. Further, in the calculating of the time series risk index, when the destination is received from the telematics terminal, the time series risk index may be calculated based on an expected driving hour, and when the destination is not received from the telematics terminal, the time series risk index may be calculated based on a mean driving hour.

The method for setting a warning reference of an advanced driver assistance system may further include: collecting, by the controller, traffic information that includes an accident occurrence section from a traffic information server; collecting, by the controller, weather information from a weather information server; and calculating, by the controller, statistical data for each item based on the collected traffic information and weather information.

In addition, the method for setting a warning reference of an advanced driver assistance system may further include calculating, by the controller, a time series conversion point based on the statistical data, and the time series risk index may be calculated by multiplying a set weight for each item by the time series conversion point. The time series risk index may include at least one of a group consisting of: a driver fatigue index, a drowsiness driving index, a driver view index, a section intimacy index, and a section risk index, and the computation weight table may be set differently depending on the driver fatigue index, the drowsiness driving index, the driver view index, the section intimacy index, and the section risk index.

The method for setting a warning reference of an advanced driver assistance system may further include when the advanced driver assistance system includes a driver drowsiness detection system, outputting, by the controller, at least one of a voice guidance message, warning sound, and news based on the drowsiness driving index. The drowsiness driving index may be corrected in real time based on correction information. The correction information may include at least one of a group consisting of: swing movement of a vehicle, an operation of a driver assistance system, an in-vehicle temperature, in-vehicle humidity, a driver's temperature, a driver's pulse, a driving hour zone, a section coincidence, and a tire pressure.

Furthermore, the method for setting a warning reference of an advanced driver assistance system may include performing at least one of a telephone call connection with a counselor and an output of a rest area guidance message based on the corrected drowsiness driving index. The method may further include calculating, by the controller, a time series warning reference based on the time series risk index; and transmitting the time series warning reference to the telematics terminal. The time series warning reference may be calculated by multiplying a set weight for each time series risk index by the time series risk index. The advanced driver assistance system may include at least one of a group consisting of: a lane maintenance assist system and a collision avoidance system, and the set weight for each time series risk index may be set differently for each of the lane maintenance assist system and the collision avoidance system.

BRIEF DESCRIPTION OF THE DRAWINGS

FIG. 3 is an exemplary block diagram schematically illustrating a telematics server according to the exemplary embodiment of the present invention;

FIG. 4 illustrates an exemplary calculation of a time series conversion point according to the exemplary embodiment of the present invention;

FIG. 5 illustrates an exemplary computation weight table for calculating a time series risk index according to the exemplary embodiment of the present invention;

FIG. 7 illustrates an exemplary computation weight table for correcting a drowsiness driving index according to the exemplary embodiment of the present invention;

FIG. 9 illustrates an exemplary computation weight table for calculating a time series warning reference according to the exemplary embodiment of the present invention;

DESCRIPTION OF SYMBOLS

Figure 1:
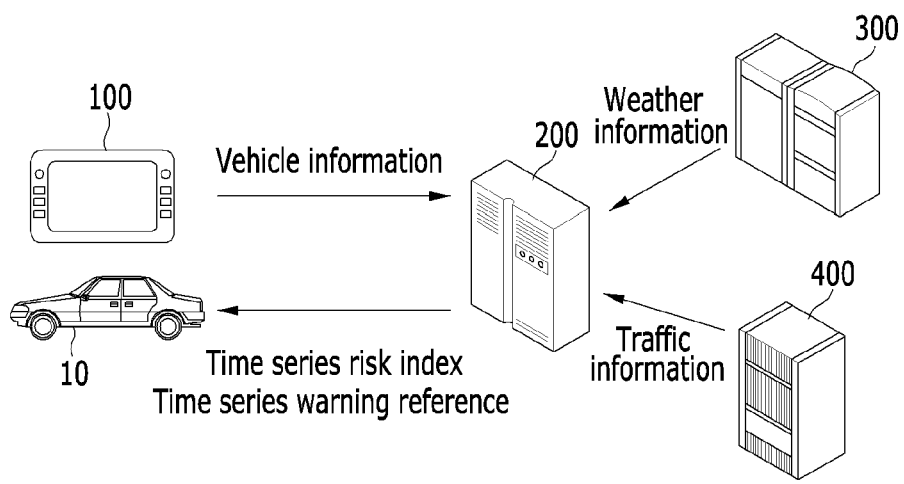
FIG. 1 is an exemplary network configuration diagram schematically illustrating a configuration of a system for setting a warning reference of an advanced driver assistance system according to an exemplary embodiment of the present invention.

| | |
|---|---|
| 10: Vehicle | |
| 50: Advanced driver assistance system | |
| 100: Telematics terminal | 110: Information collecting unit |
| 120: Storage unit | 130: Input unit |
| 140: Terminal communication unit | 150: Information providing unit |
| 160: Terminal controller | |
| 200: Telematics server | 210: Server communication unit |
| 220: Authentication unit | 230: Conversion point calculating unit |
| 240: Risk index calculating unit | 250: Warning reference calculating unit |
| 260: Database | 270: Server controller |
| 300: Weather information server | |
| 400: Traffic information server | |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

FIG. 1 is an exemplary network configuration diagram schematically illustrating a configuration of a system for setting a warning reference of an advanced driver assistance system according to an exemplary embodiment of the present invention. Referring to FIG. 1, the system for setting a warning reference of an advanced driver assistance system according to the exemplary embodiment of the present invention may include a telematics terminal 100 and a telematics server 200 mounted within a vehicle 10. Further, the system may include a weather information server 300 and a traffic information server 400.

The telematics terminal 100 may be configured to collect vehicle information based on a driving condition to transmit the collected vehicle information to the telematics server 200 via a wireless communication network. The vehicle information may include a destination, driver's personal information, driving distance information, driving hour information, vehicle speed information, acceleration/deceleration information, driving section information, a multimedia operating history, a safety device operating history, and a driver assistance system operating history. The vehicle information may be information associated with driver's safety.

The driver's personal information may include information for customer authentication. The driving distance information may include information associated with a driving distance of the vehicle after starting and a driving distance for each period (e.g., daily, weekly, monthly, or yearly). The driving hour information may include information associated with a driving hour of the vehicle after starting and a driving hour for each period (e.g., daily, weekly, monthly, or yearly).

The telematics server 200 may be configured to store information received from the telematics terminal 100 and calculate statistical data for each item based on the stored information. The telematics server 200 may be configured to calculate at least one time series risk index and at least one time series warning reference using the calculated statistical data and transmit the calculated time series risk index and time series warning reference to the telematics terminal 100. A detailed content thereof will be described below with reference to FIGS. 2 to 11.

The telematics server 200 may be configured to receive traffic information and weather information in link with the weather information server 300 and the traffic information server 400 to calculate the reliable time series risk index and time series warning reference. The weather information server 300 may be configured to transmit weather information based on an open application programmer interface (API) to the telematics server 200. The weather information may include information associated with a temperature, a humidity, fog, rain, and snow. The traffic information server 400 may be configured to transmit traffic information based on the open application programmer interface (API) to the telematics server 200. The traffic information may include information associated with an accident occurrence section.

Figure 2:
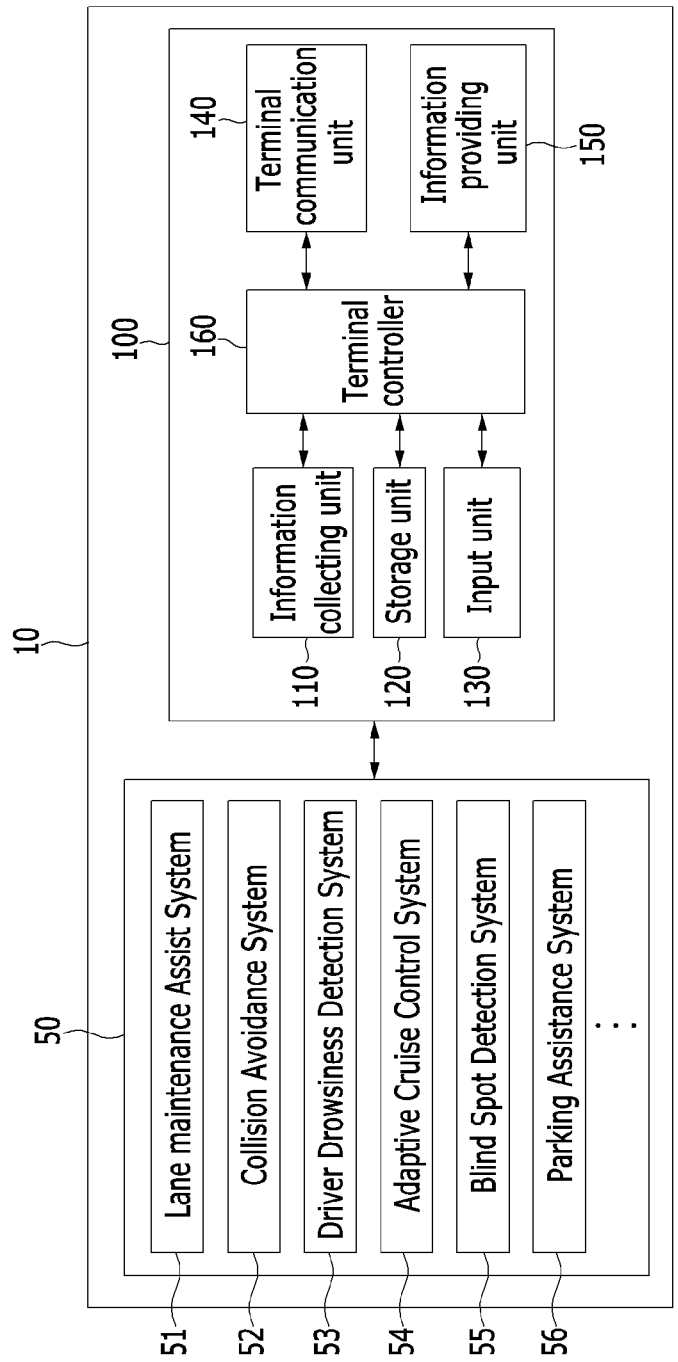
FIG. 2 is an exemplary block diagram schematically illustrating a vehicle according to the exemplary embodiment of the present invention.

FIG. 2 is an exemplary block diagram schematically illustrating a vehicle according to the exemplary embodiment of the present invention. Referring to FIG. 2, the vehicle 10 may include an advanced driver assistance system 50 and a telematics terminal 100.

In particular, the advanced driver assistance system (ADAS) 50 may include a lane keeping assist system (LKAS) 51, a collision avoidance system (CAS) 52, a driver drowsiness detection system 53, an adaptive cruise control (ACC) system 54, a blind spot detection (B SD) system 55, a parking assistance system (PAS) 56, and the like. Since operations of the systems are apparent to those skilled in the art, a detailed description thereof will be omitted. The telematics terminal 100 may include a plurality of units executed by a terminal controller 160. The plurality of units may include an information collecting unit 110, a storage unit 120, an input unit 130, a terminal communication unit 140, and an information providing unit 150.

The information collecting unit 110 may be configured to collect the vehicle information based on the driving condition. The collected information may be information that may be managed and acquired in real time while driving via various sensors and a navigation system disposed within the vehicle. In particular, the collected information may be information associated with driver's safety. The collected information may be transferred to the storage unit 120, and stored and classified within the storage unit 120. Additionally, the information collected by the information collecting unit 110 may be transferred to the terminal controller 160. Further, required information may be extracted from the information stored in the storage unit 120 to be transferred to the terminal controller 160.

When the destination is input by a driver's operation, the input unit 130 may be configured to transfer the input destination to the terminal controller 160. The terminal communication unit 140 may be configured to transmit the collected information to the telematics server 200 via the wireless communication network. Further, the terminal communication unit 140 may be configured to receive the time series risk index and the time series warning reference calculated by the telematics server 200. The information providing unit 150 may be configured to provide the time series risk index and the time series warning reference to the advanced driver assistance system 50 according to operation by the terminal controller 160.

The terminal controller 160 may be implemented by one or more microprocessors that operate by a set program, and the set programs may include a series of commands for performing respective steps included in a method for setting a warning reference of the advanced driver assistance system 50 according to an exemplary embodiment of the present invention to be described below. The terminal controller 160 may be configured to execute an overall operation of the telematics terminal 100.

Hereinafter, a method for calculating a warning reference of an advanced driver assistance system 50 by a telematics server will be described in detail with reference to FIGS. 3 to 10. FIG. 3 is an exemplary block diagram schematically illustrating a telematics server according to the exemplary embodiment of the present invention.

Referring to FIG. 3, the telematics server 200 may include a plurality of units exectued by a server controller 270. The plurality of units may include a server communication unit 210, an authentication unit 220, a conversion point calculating unit 230, a risk index calculating unit 240, a warning reference calculating unit 250, a and database 260.

The server communication unit 210 may be configured to receive the vehicle information from the telematics terminal 100. Further, the server communication unit 210 may be configured to receive the weather information and traffic information in link with the weather information server 300 and the traffic information server 400. The received information may be stored and classified within the database 260. In other words, as the information received from the telematics terminal 100 increases, information accumulated in the database 260 may increase. Further, the server communication unit 210 may be configured to transmit the warning reference of the advanced driver assistance system 50 to the telematics terminal 100. The warning reference may include the time series risk index and the time series warning reference.

The authentication unit 220 may be configured to perform a driver authenticating operation in response to an authentication request of the telematics terminal 100. In addition, the authentication unit 220 may be configured to perform an authentication procedure based on driver's authentication information registered in advance and received driver's personal information. The conversion point calculating unit 230 may be configured to calculate the statistical data for each item based on the information accumulated in the database 260 and calculate a time series conversion point based on the statistical data.

FIG. 4 illustrates an exemplary calculation of a time series conversion point according to the exemplary embodiment of the present invention. Referring to FIG. 4, the conversion point calculating unit 230 may be configured to calculate and a time series conversion point of the statistical data for each item and a specific time while driving. For example, the conversion point calculating unit 230 may be configured to calculate an expected driving distance and an expected driving hour up to the destination in response to receiving the destination. The conversion point calculating unit 230 may be configured to calculate a mean driving distance and a mean driving hour using the information accumulated in the database 260 in response to not receiving the destination.

The conversion point calculating unit 230 may be configured to calculate a time series conversion point based on the statistical data for each item. The time series conversion point as a value which is changed based on the driving hour may be calculated as a value determined to be preferable by those skilled in the art for each statistical data. For the weather information, a time series graph which is changed with time based on information received from the weather information server may be used as statistical data.

Furthermore, the conversion point calculating unit 230 may be configured to calculate statistical data that corresponds to acceleration and deceleration indexes by considering acceleration and deceleration ratios. In particular, the conversion point calculating unit 230 may be configured to calculate a conversion point based on a function included in the advanced driver assistance system 50 mounted within the vehicle 10. For example, the conversion point calculating unit 230 may be configured to calculate a low conversion point when the advanced driver assistance system 50 includes the lane maintenance assist system 51. A time series conversion point calculating method of the conversion point calculating unit 230 is just one example and the present invention is not limited thereto. Additionally, the risk index calculating unit 240 may be configured to calculate a risk index (e.g., time series risk index) which may be changed with time based on the time series conversion point and a computation weight table stored in the database 260.

FIG. 5 illustrates an exemplary computation weight table for calculating a time series risk index according to the exemplary embodiment of the present invention. Referring to FIG. 5, the risk index calculating unit 240 may be configured to multiply the time series conversion point by a set weight (e.g., first to fifth weights) for each item to calculate the time series risk index. The risk index calculating unit 240 may further be configured to correct the time series risk index using a first correction value. The first correction value may be set as a value determined to be preferable by those skilled in the art by considering reliability of the time series risk index. The time series risk index may include a driver fatigue index, a drowsiness driving index, a driver view index, a section intimacy index, and a section risk index.

The computation weight table may be set differently based on the driver fatigue index, the drowsiness driving index, the driver view index, the section intimacy index, and the section risk index. In other words, for the driver fatigue index, a larger weight may be granted to the expected driving hour; for the drowsiness driving index, a larger weight may be granted to the expected driving distance and the expected driving hour; for the driver view index, a larger weight may be granted to the fog, the rain, and the snow; for the section intimacy index, a larger weight may be granted to the number of times to visit the driving section; and for the section risk index, a larger weight may be granted to the accident occurrence section. The computation weight table is merely one example and the present invention is not limited thereto.

Figure 6:
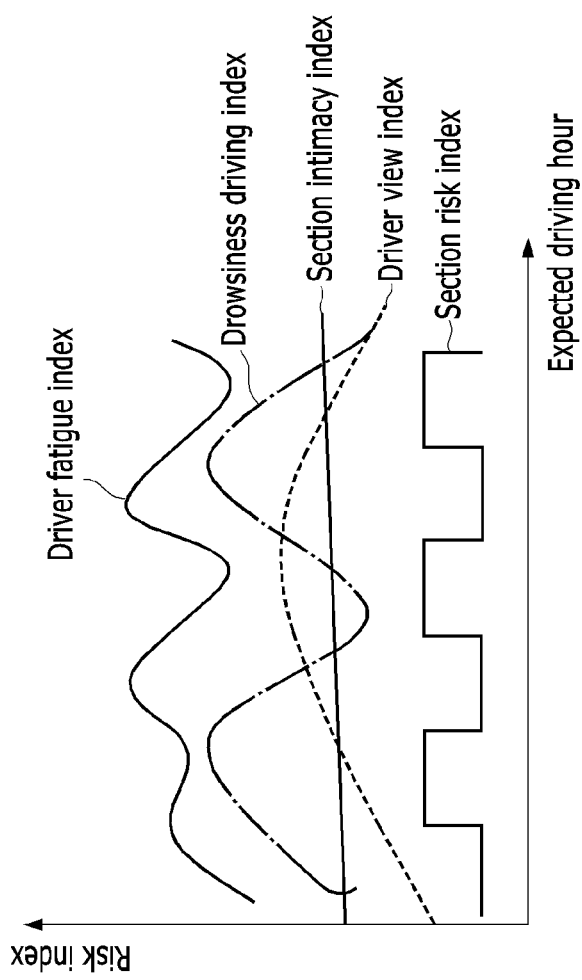
FIG. 6 is an exemplary graph illustrating the time series risk index according to the exemplary embodiment of the present invention.

FIG. 6 is an exemplary graph illustrating the time series risk index according to the exemplary embodiment of the present invention. Referring to FIG. 6, when the destination is received, the risk index calculating unit 240 may be configured to calculate a driver fatigue index, a drowsiness driving index, a driver view index, a section intimacy index, and a section risk index which may change based on the expected driving hour.

When the advanced driver assistance system 50 includes the driver drowsiness detection system 53, the driver drowsiness detection system 53 may be configured to receive the calculated drowsiness driving index from the telematics terminal 100. The driver drowsiness detection system 53 may be configured to output at least one of a voice guidance message, alarm sound, and news (e.g., a written message) based on the drowsiness driving index. In particular, the driver drowsiness detection system 53 may be configured to warn of drowsiness based on the drowsiness driving index, but the present invention is not limited thereto and it may be possible to warn of drowsiness regardless of inclusion of the driver drowsiness detection system 53. Further, the drowsiness driving index may be corrected in real time.

Figure 8:
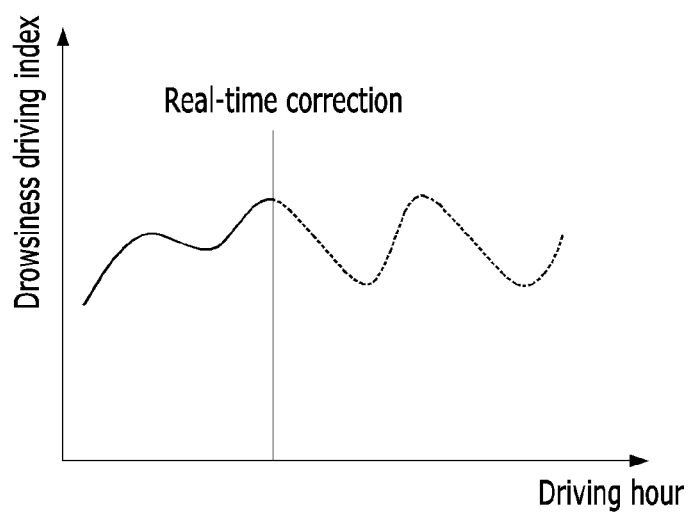
FIG. 8 is an exemplary graph illustrating the corrected drowsiness driving index according to the exemplary embodiment of the present invention.

FIG. 7 illustrates an exemplary computation weight table for correcting a drowsiness driving index according to the exemplary embodiment of the present invention. FIG. 8 is an exemplary graph illustrating the corrected drowsiness driving index according to the exemplary embodiment of the present invention. Referring to FIGS. 7 and 8, the driver drowsiness detection system 53 may be configured to correct the drowsiness driving index based on correction information in real time. The correction information may include swing movement of a vehicle, an operation of a driver assistance system, an in-vehicle temperature, in-vehicle humidity, a driver's temperature, a driver's pulse, a driving hour zone, a section coincidence, and a tire pressure.

The driver drowsiness detection system 53 may be configured to calculate a conversion point for each correction information, and calculate a second correction value by multiplying the conversion point by a weight (e.g., sixth weight) for each item. In addition, the driver drowsiness detection system 53 may be configured to correct the drowsiness driving index in real time using the second correction value. The driver drowsiness detection system 53 may further be configured to perform at least one of a telephone call connection with a counselor and an output of a rest area guidance message based on the corrected drowsiness driving index. A warning reference calculating unit 250 may be configured to calculate a warning reference (e.g., time series warning reference) which may change with time based on the time series risk index.

FIG. 9 illustrates an exemplary computation weight table for calculating a time series warning reference according to the exemplary embodiment of the present invention. Referring to FIG. 9, the warning reference calculating unit 250 may be configured to multiply the time series risk index by a set weight (e.g., a seventh or eighth weight) for each item to calculate the time series warning reference. The warning reference calculating unit 250 may be configured to correct the time series warning reference using a second correction value. The second correction value may be set as a value determined to be preferable by those skilled in the art by considering reliability of the time series risk index.

The computation weight table may be set differently according to a function of the advanced driver assistance system 50. In other words, for a time series warning reference of a lane maintenance assist system 51, a larger weight may be granted to the driver fatigue index and the drowsiness driving index and for a time series warning reference of a collision avoidance system 52, a larger weight may be granted to the driver drowsiness driving index and the driver view index. The computation weight table is merely one example and the present invention is not limited thereto.

Figure 10:
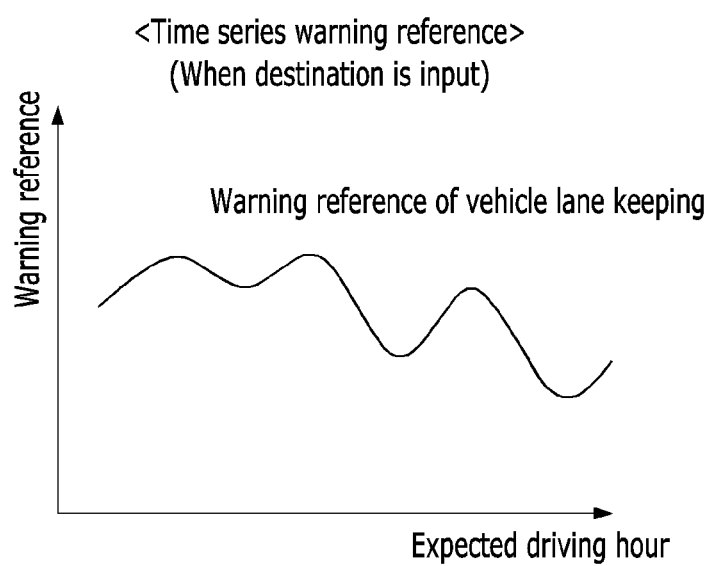
FIG. 10 is an exemplary graph illustrating the time series warning reference according to the exemplary embodiment of the present invention.

FIG. 10 is an exemplary graph illustrating the time series warning reference according to the exemplary embodiment of the present invention. Referring to FIG. 10, when a destination is received, the warning reference calculating unit 250 may be configured to calculate the time series warning reference of the lane maintenance assist system 51 which may change with an expected driving hour.

The database 260 may be configured to store the vehicle information received from the telematics terminal 100. Further, the database 260 may be configured to store the calculated statistical data, time series conversion point, time series risk index, and time series warning reference. A server controller 270 may be configured to operate the telematics server 200. In particular, the server controller 270 may be implemented by one or more microprocessors that operate by a set program, and the set programs may include a series of commands for performing respective steps included in a method for setting a warning reference of the advanced driver assistance system 50 according to an exemplary embodiment of the present invention to be described below. Further, although the authentication unit 220, the conversion point calculating unit 230, the risk index calculating unit 240, and the warning reference calculating unit 250 which are connected with the server controller 270 are illustrated in FIG. 3, the authentication unit 220, the conversion point calculating unit 230, the risk index calculating unit 240, and the warning reference calculating unit 250 may be modularized and embedded within the server controller 270.

Figure 11:
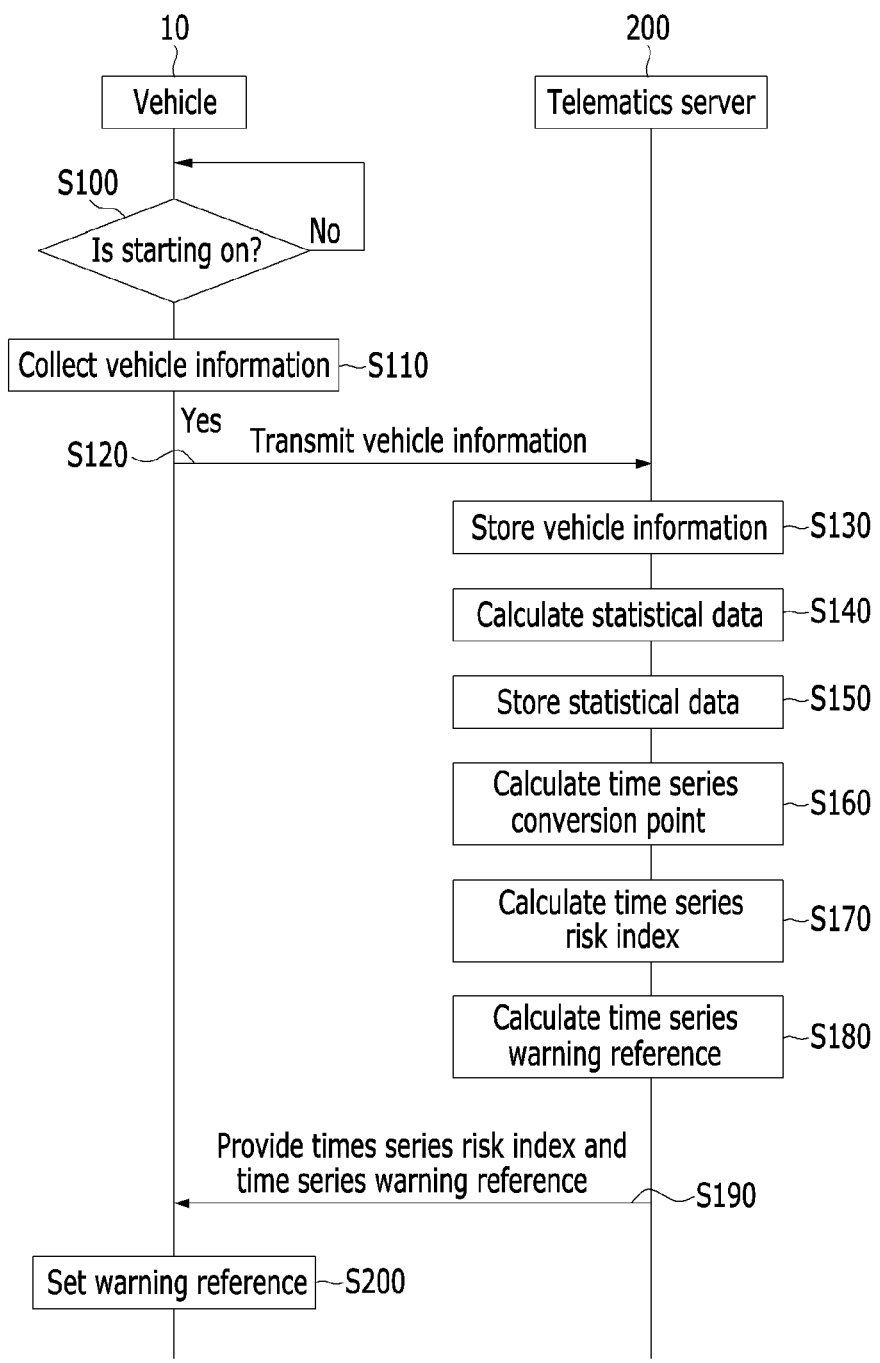
FIG. 11 is an exemplary flowchart illustrating a method for setting a warning reference of an advanced driver assistance system according to an exemplary embodiment of the present invention.

FIG. 11 is an exemplary flowchart illustrating a method for setting a warning reference of an advanced driver assistance system according to an exemplary embodiment of the present invention. Referring to FIG. 11, when starting of a vehicle 10 is on (S100), a telematics terminal 100 may be configured to collect vehicle information (S110). The vehicle information may include at least one of a destination, driver's personal information, driving distance information, driving hour information, vehicle speed information, acceleration/deceleration information, driving section information, a multimedia operating history, a safety device operating history, and a driver assistance system operating history.

The telematics terminal 100 may be configured to transmit the vehicle information to a telematics server 200 (S120). The telematics server 200 may be configured to receive the vehicle information and store the vehicle information in a database 260 (S130). In addition, the telematics server 200 may be configured to calculate statistical data for each item based on the information stored in the database 260 (S140). The telematics server 200 may also be configured to store the statistical data in the database 260 (S150).

Additionally, the telematics server 200 may be configured to calculate a time series conversion point based on the statistical data stored in the database 260 (S160). The telematics server 200 may further be configured to calculate a time series risk index based on the time series conversion point and a computation weight table stored in the database 260 (S170). The telematics server 200 may be configured to calculate a time series warning reference based on the time series risk index (S180). Further, the telematics server 200 may be configured to transmit the time series risk index and the time series warning reference to the telematics terminal 100 (S190).

An advanced driver assistance system 50 mounted within the vehicle 10 may include one or more systems that assist a driver and a warning reference for each system may be set according to the time series risk reference or the time series warning reference (S200). For example, when the time series risk index (e.g., drowsiness driving index) is applied to a driver drowsiness detection system 53, a warning reference in initial driving and a warning reference in a section where a driver becomes most drowsy or it is most dangerous may be set differently to provide a warning reference optimized to a driver. As a result, according to the exemplary embodiment of the present invention, a driving pattern may be utilized using telematics technology to set a warning reference of an advanced driver assistance system optimized for each driver. A more accurate warning reference of the advanced driver assistance system may be set using traffic information and weather information and a warning reference that may change with driving time not uniformly may be set to improve driver safety.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method for setting a warning reference of an advanced driver assistance system, the method comprising:
   receiving, by a controller, vehicle information based on a driving condition from a telematics terminal;
   calculating, by the controller, statistical data for each item within the vehicle information based on the received vehicle information;
   storing, by the controller, the statistical data in a database;
   calculating, by the controller, at least one time series risk index based on statistical data and a computation weight table stored in the database;
   transmitting, by the controller, the time series risk index to the telematics terminal;
   calculating, by the controller, a time series warning reference based on the time series risk index; and
   transmitting, by the controller, the time series warning reference to the telematics terminal.

2. The method of claim 1, wherein the vehicle information includes at least one of a group consisting of: a destination, personal information of a driver, driving distance information, driving hour information, vehicle speed information, acceleration and deceleration information, driving section information, a multimedia operating history, a safety device operating history, and a driver assistance system operating history.

3. The method of claim 2, wherein in the calculating of the time series risk index, when the destination is received from the telematics terminal, the time series risk index is calculated based on an expected driving hour, and when the destination is not received from the telematics terminal, the time series risk index is calculated based on a mean driving hour.

4. The method of claim 1, further comprising:
   collecting, by the controller, traffic information including an accident occurrence section from a traffic information server;
   collecting, by the controller, weather information from a weather information server; and
   calculating, by the controller, statistical data for each item within the vehicle information based on the collected traffic information and weather information.

5. The method of claim 1, further comprising:
   calculating, by the controller, a time series conversion point based on the statistical data,
   wherein the time series risk index is calculated by multiplying a set weight for each item within the vehicle information by the time series conversion point.

6. The method of claim 5, wherein the time series risk index includes at least one of a group consisting of: a driver fatigue index, a drowsiness driving index, a driver view index, a section intimacy index, and a section risk index, and the computation weight table is set differently based on the driver fatigue index, the drowsiness driving index, the driver view index, the section intimacy index, and the section risk index.

7. The method of claim 6, further comprising:
when the advanced driver assistance system includes a driver drowsiness detection system, outputting, by the controller, at least one of a group consisting of: a voice guidance message, warning sound, and a written message based on the drowsiness driving index.

8. The method of claim 6, wherein the drowsiness driving index is corrected in real time based on correction information, and the correction information includes at least one of a group consisting of: a swing movement of a vehicle, an operation of a driver assistance system, an in-vehicle temperature, in-vehicle humidity, a driver's temperature, a driver's pulse, a driving hour zone, a section coincidence, and a tire pressure.

9. The method of claim 8, further comprising:
performing, by the controller, at least one of a telephone call connection with a counselor and an output of a rest area guidance message based on the corrected drowsiness driving index.

10. The method of claim 1, wherein the time series warning reference is calculated by multiplying a set weight for each time series risk index by the time series risk index.

11. The method of claim 10, wherein the advanced driver assistance system includes at least one of a group consisting of: a lane maintenance assist system and a collision avoidance system, and the set weight for each time series risk index is set differently for each of the lane maintenance assist system and the collision avoidance system.

12. A system for setting a warning reference of an advanced driver assistance system, the system comprising:
a memory configured to store program instructions; and
a processor configured to execute the program instructions, the program instructions when executed configured to:
recieve vehicle information based on a driving condition from a telematics terminal;
calculate statistical data for each item within the vehicle information based on the received vehicle information;
store the statistical data in a database;
calculate at least one time series risk index based on statistical data and a computation weight table stored in the database;
transmit the time series risk index to the telematics terminal;
calculate a time series warning reference based on the time series risk index; and
transmit the time series warning reference to the telematics terminal.

13. The system of claim 12, wherein the vehicle information includes at least one of a group consisting of: a destination, personal information of a driver, driving distance information, driving hour information, vehicle speed information, acceleration and deceleration information, driving section information, a multimedia operating history, a safety device operating history, and a driver assistance system operating history.

14. The system of claim 12, wherein the program instructions when executed are further configured to:
collect traffic information including an accident occurrence section from a traffic information server;
collect weather information from a weather information server; and
calculate statistical data for each item within the vehicle information based on the collected traffic information and weather information.

15. The system of claim 12, wherein the program instructions when executed are further configured to:
calculate a time series conversion point based on the statistical data,
wherein the time series risk index is calculated by multiplying a set weight for each item within the vehicle information by the time series conversion point.

16. The system of claim 15, wherein the time series risk index includes at least one of a group consisting of: a driver fatigue index, a drowsiness driving index, a driver view index, a section intimacy index, and a section risk index, and the computation weight table is set differently based on the driver fatigue index, the drowsiness driving index, the driver view index, the section intimacy index, and the section risk index.

17. A non-transitory computer readable medium containing program instructions executed by a controller, the computer readable medium comprising:
program instructions that recieve vehicle information based on a driving condition from a telematics terminal;
program instructions that calculate statistical data for each item within the vehicle information based on the received vehicle information;
program instructions that store the statistical data in a database;
program instructions that calculate at least one time series risk index based on statistical data and a computation weight table stored in the database;
program instructions that transmit the time series risk index to the telematics terminal;
program instructions that calculate a time series warning reference based on the time series risk index; and
program instructions that transmit the time series warning reference to the telematics terminal.

18. The non-transitory computer readable medium of claim 17, wherein the vehicle information includes at least one of a group consisting of: a destination, personal information of a driver, driving distance information, driving hour information, vehicle speed information, acceleration and deceleration information, driving section information, a multimedia operating history, a safety device operating history, and a driver assistance system operating history.

19. The non-transitory computer readable medium of claim 17, further comprising:
program instructions that collect traffic information including an accident occurrence section from a traffic information server;
program instructions that collect weather information from a weather information server; and
program instructions that calculate statistical data for each item within the vehicle information based on the collected traffic information and weather information.

* * * * *